(12) United States Patent
Baker

(10) Patent No.: US 6,730,853 B1
(45) Date of Patent: May 4, 2004

(54) RODENT OBSTRUCTING SYSTEM

(76) Inventor: Kenneth P. Baker, 5120 County #4, NE., Remer, MN (US) 56672

( * ) Notice: Subject to any disclaimer, the term of this patent is extended or adjusted under 35 U.S.C. 154(b) by 0 days.

(21) Appl. No.: 10/364,077

(22) Filed: Feb. 10, 2003

(51) Int. Cl.$^7$ ................................................ H01B 7/00
(52) U.S. Cl. .................... 174/138 R; 174/101; 174/135
(58) Field of Search ............... 174/138 R, 139, 174/135, 138 E; 52/101

(56) References Cited

U.S. PATENT DOCUMENTS

| | | | | |
|---|---|---|---|---|
| 2,173,710 A | | 9/1939 | Carlson | 230/244 |
| 2,395,635 A | | 2/1946 | Matson | 14/72 |
| 3,773,969 A | * | 11/1973 | Geisel | 174/67 |
| 3,811,004 A | * | 5/1974 | Moore | 174/67 |
| 3,824,934 A | | 7/1974 | Laakkonen | 109/1 |
| 3,859,454 A | * | 1/1975 | Mann | 174/66 |
| 3,873,758 A | * | 3/1975 | VanGessel et al. | 174/48 |
| 4,688,491 A | * | 8/1987 | Herrera et al. | 108/50.02 |
| 5,465,532 A | | 11/1995 | Varin | 49/493.1 |
| D367,645 S | * | 3/1996 | Hashizawa et al. | D13/146 |
| 5,650,594 A | | 7/1997 | Urnovitz | 174/139 |
| 5,669,187 A | | 9/1997 | Bushong | 52/101 |
| 5,771,641 A | | 6/1998 | Morris, III | 52/101 |

* cited by examiner

*Primary Examiner*—Anthony Dinkins
*Assistant Examiner*—Jinhee Lee

(57) ABSTRACT

A rodent obstructing system for preventing access to the interior of a mobile camper through the electrical access door. The rodent obstructing system includes a plug member having a first side slot and a second side slot, an upper opening within the plug member, and a receiver opening within the plug member connected to the upper opening for receiving a power cord. The plug member fits within the lower slot of the access door with an electrical box thereby sealing the electrical box. A cord member is preferably attached to the plug member and to the electrical box to prevent loss of the plug member.

15 Claims, 7 Drawing Sheets

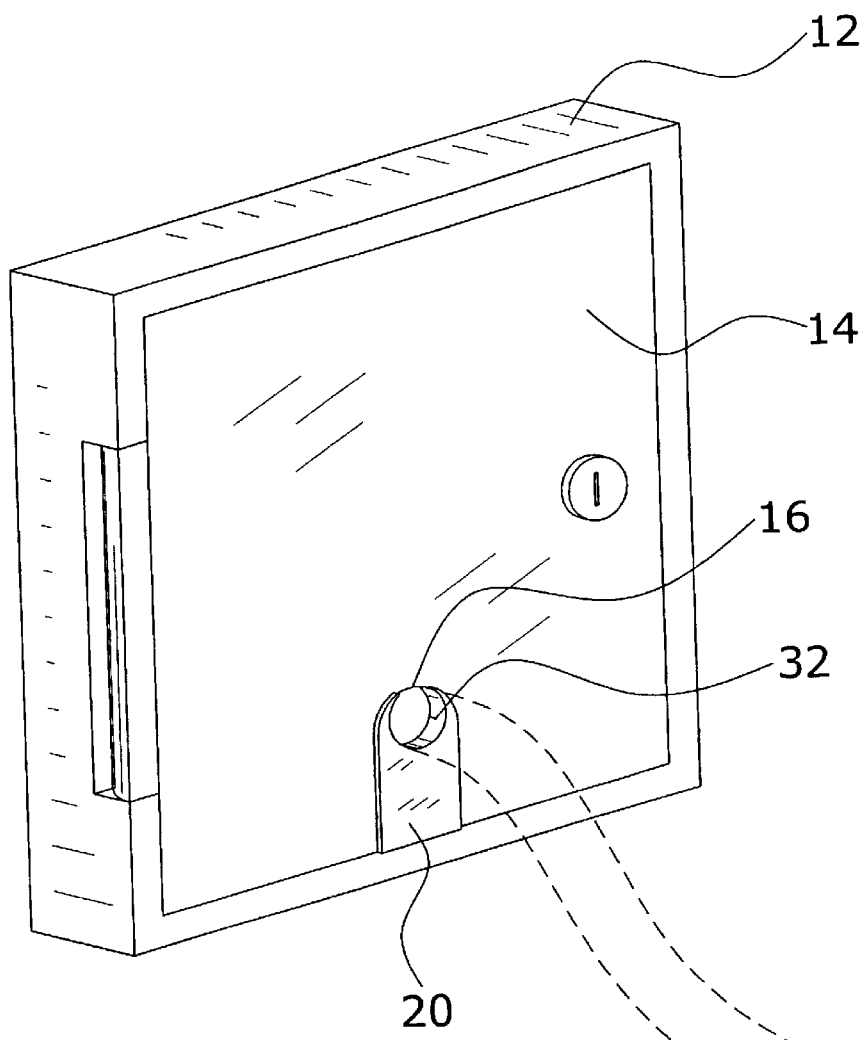
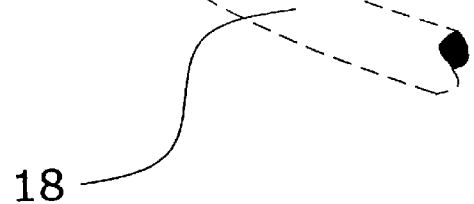

RODENT OBSTRUCTING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to electrical access doors within campers and more specifically it relates to a rodent obstructing system for preventing access to the interior of a mobile camper through the electrical access door.

2. Description of the Related Art

Electrical access doors within mobile campers such as motor homes have been in use for years. Electrical access doors within campers typically have a lower vertical slot for allowing a power cord to extend through when connected to a power supply. FIGS. 2 through 4 of the drawings illustrate an electrical access door (14) with a lower slot (16) within an electrical box (12) of a camper. The main problem with conventional electrical access doors is that they allow for rodents and debris to enter the electrical box and the camper. Rodents entering the interior of a camper can destroy the appearance and cleanliness of the camper. In addition, rodents entering the interior of a camper can cause significant and costly property damage.

Examples of patented devices which may be related to the present invention include U.S. Pat. No. 5,650,594 to Urnovitz; U.S. Pat. No. 2,395,635 to Matson; U.S. Pat. No. 5,771,641 to Morris, III; U.S. Pat. No. 2,173,710 to Carlson; U.S. Pat. No. 3,824,934 to Laakkonen; U.S. Pat. No. 5,669,187 to Bushong; and U.S. Pat. No. 5,465,532 to Varin.

While these devices may be suitable for the particular purpose to which they address, they are not as suitable for preventing access to the interior of a mobile camper through the electrical access door. Conventional electrical access doors allow for rodents and the like to freely enter a camper.

In these respects, the rodent obstructing system according to the present invention substantially departs from the conventional concepts and designs of the prior art, and in so doing provides an apparatus primarily developed for the purpose of preventing access to the interior of a mobile camper through the electrical access door.

BRIEF SUMMARY OF THE INVENTION

In view of the foregoing disadvantages inherent in the known types of electrical access doors for campers now present in the prior art, the present invention provides a new rodent obstructing system construction wherein the same can be utilized for preventing access to the interior of a mobile camper through the electrical access door.

The general purpose of the present invention, which will be described subsequently in greater detail, is to provide a new rodent obstructing system that has many of the advantages of the electrical access doors mentioned heretofore and many novel features that result in a new rodent obstructing system which is not anticipated, rendered obvious, suggested, or even implied by any of the prior art electrical access doors, either alone or in any combination thereof.

To attain this, the present invention generally comprises a plug member having a first side slot and a second side slot, an upper opening within the plug member, and a receiver opening within the plug member connected to the upper opening for receiving a power cord. The plug member fits within the lower slot of the access door with an electrical box thereby sealing the electrical box. A cord member is preferably attached to the plug member and to the electrical box to prevent loss of the plug member.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a rodent obstructing system that will overcome the shortcomings of the prior art devices.

A second object is to provide a rodent obstructing system for preventing access to the interior of a mobile camper through the electrical access door.

Another object is to provide a rodent obstructing system that maintains the cleanliness of the interior of a camper.

An additional object is to provide a rodent obstructing system that may be utilized upon various sizes of power supply cords.

A further object is to provide a rodent obstructing system that reduces repair and maintenance costs for a camper.

Other objects and advantages of the present invention will become obvious to the reader and it is intended that these objects and advantages are within the scope of the present invention.

To the accomplishment of the above and related objects, this invention, may be embodied in the form illustrated in the accompanying drawings, attention being called to the fact, however, that the drawings are illustrative only, and that changes may be made in the construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 4 is an upper perspective view of the present invention with respect to an electrical access door.

DETAILED DESCRIPTION OF THE INVENTION

Figure 1:
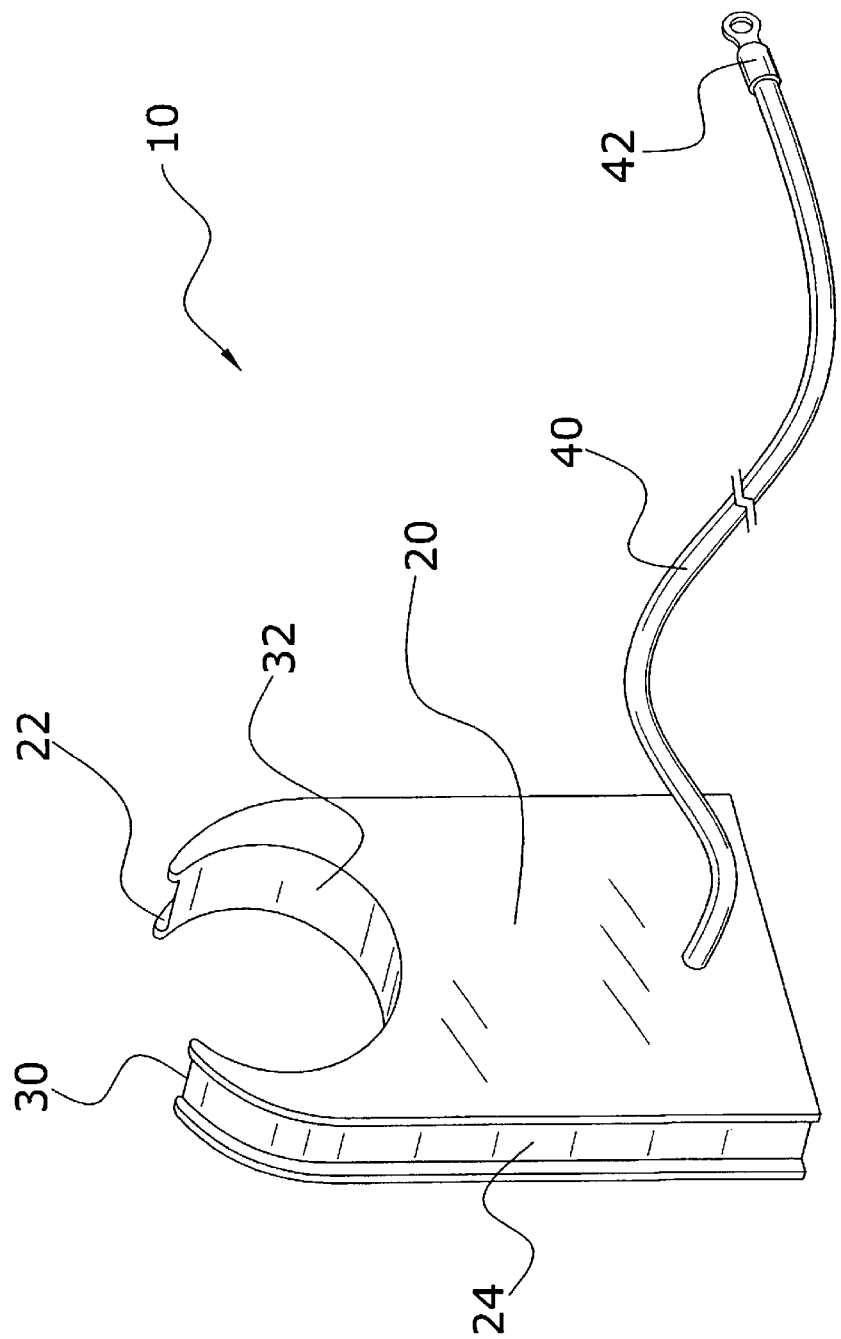
FIG. 1 is an upper perspective view of the present invention.

Turning now descriptively to the drawings, in which similar reference characters denote similar elements throughout the several views, FIGS. 1 through 7 illustrate a rodent obstructing system 10, which comprises a plug member 20 having a first side slot 22 and a second side slot 24, an upper opening 30 within the plug member 20, and a receiver opening 32 within the plug member 20 connected to the upper opening 30 for receiving a power cord 18. The plug member 20 fits within the lower slot 16 of the access door 14 with an electrical box 12 thereby sealing the electrical box 12. A cord member 40 is preferably attached to the plug member 20 and to the electrical box 12 to prevent loss of the plug member 20.

As shown in FIGS. 1 through 7 of the drawings, the plug member 20 has a rectangular shaped structure with a curved upper end to conform to the shape of the lower slot 16 of the access door 14. The plug member 20 may have various other shapes depending upon the shape of the lower slot 16.

The plug member 20 preferably has a first side slot 22 and a second side slot 24 within opposing sides of the plug member 20 for receiving the inner edges of the lower slot 16. The first side slot 22 and the second side slot 24 form flanged walls that engage the exterior and interior surfaces of the access door 14 surrounding the lower slot 16 thereby sealing the lower slot 16. The plug member 20 preferably has a thickness similar to the thickness of the access door 14.

The plug member 20 is preferably comprised of a resilient and flexible material for allowing conforming to the shape of the lower slot 16 and for fitting snugly about the power cord 18 as shown in FIG. 4 of the drawings. The plug member 20 may be comprised of various materials such as but not limited to plastic, rubber, wood, metal, composite and the like.

Figure 5:
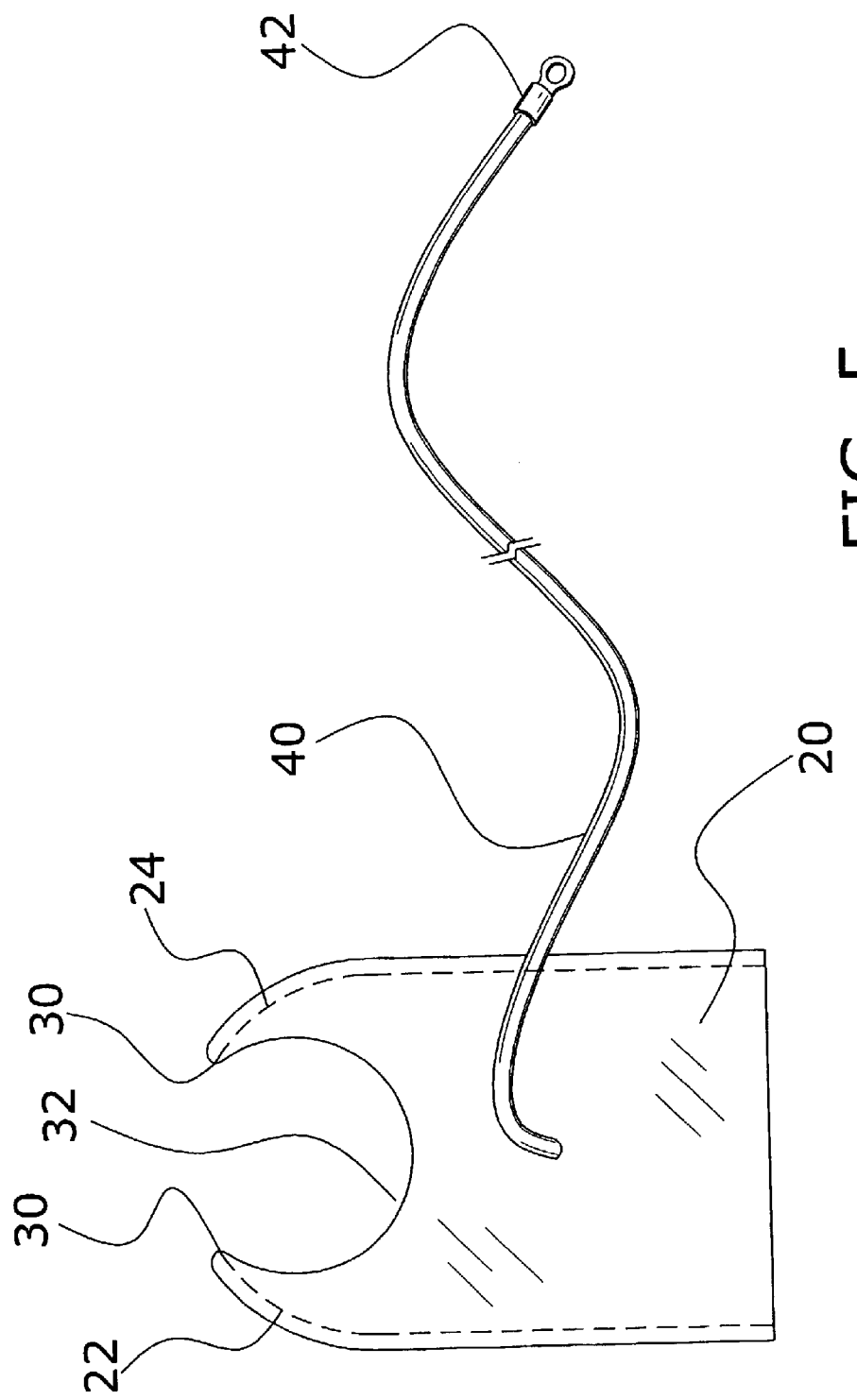
FIG. 5 is a front view of the present invention.
Figure 6:
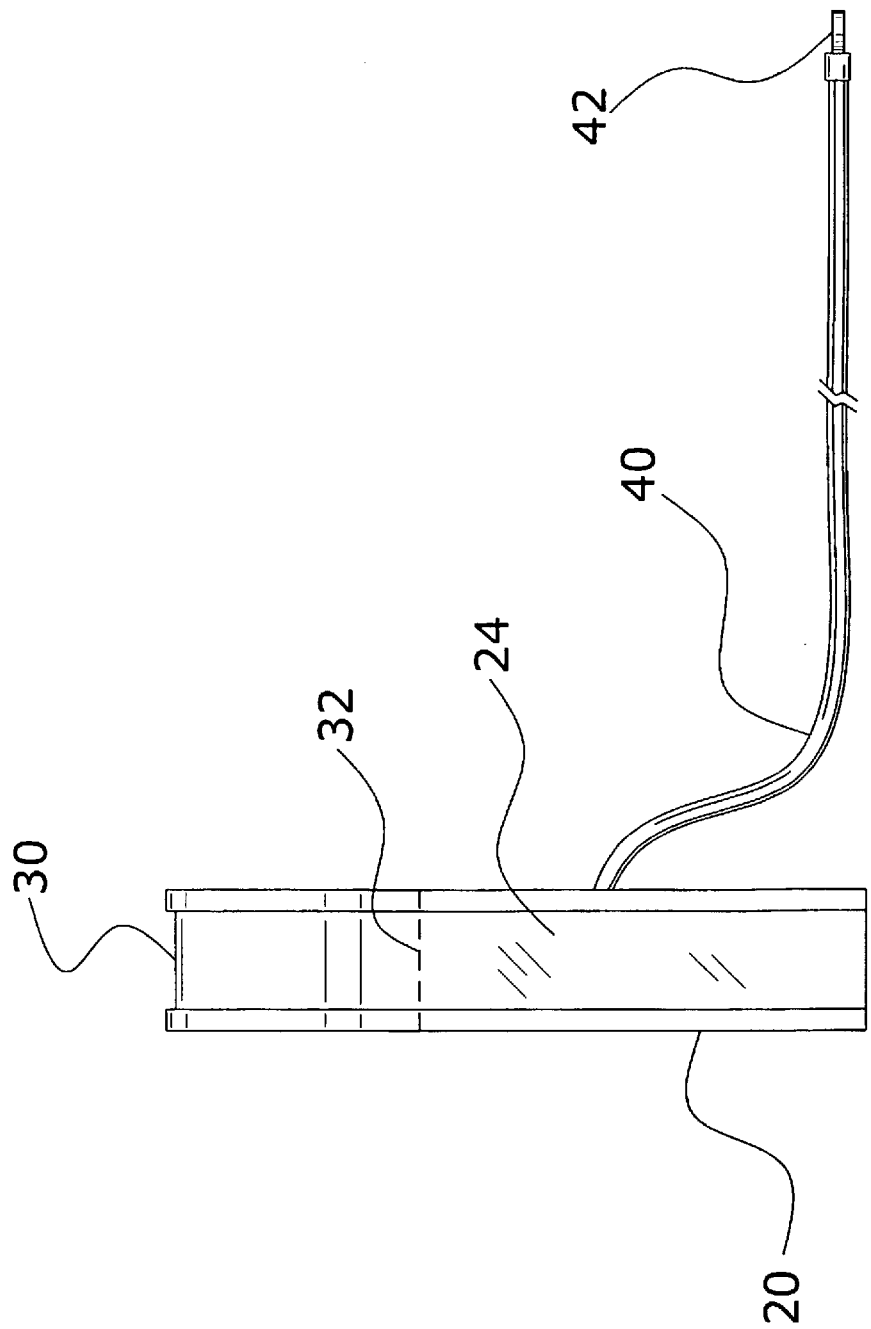
FIG. 6 is a side view of the present invention.

The upper end of the plug member 20 includes an upper opening 30 and a receiver opening 32 for receiving the power cord 18. The upper opening 30 is preferably smaller in width than the diameter of the receiver opening 32 as best illustrated in FIG. 5 of the drawings. The receiver opening 32 is formed to receive one or more sizes of power cords 18 which can vary in size depending upon the power requirements.

Figure 2:
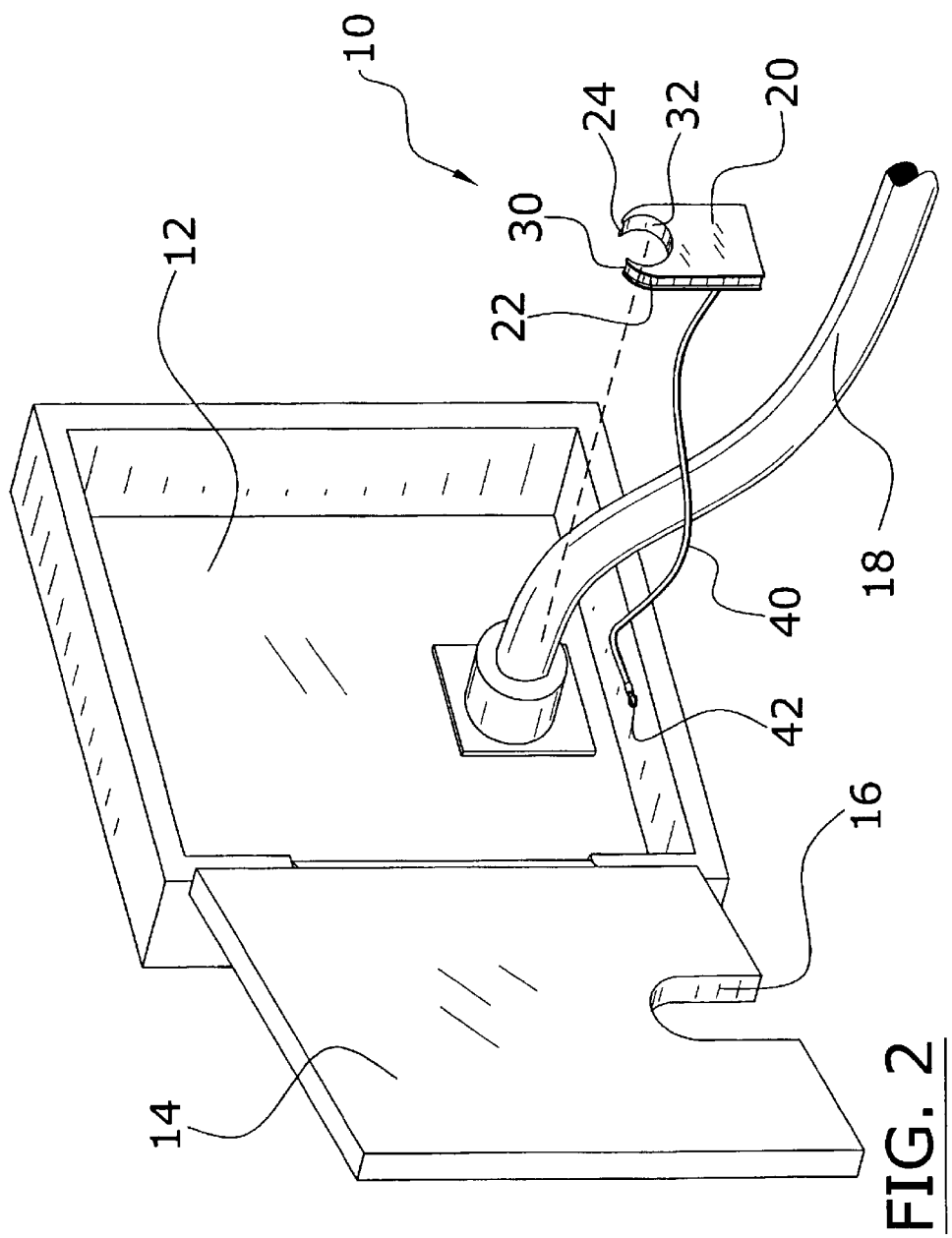
FIG. 2 is an exploded upper perspective view of the present invention with respect to an electrical access door.
Figure 7:
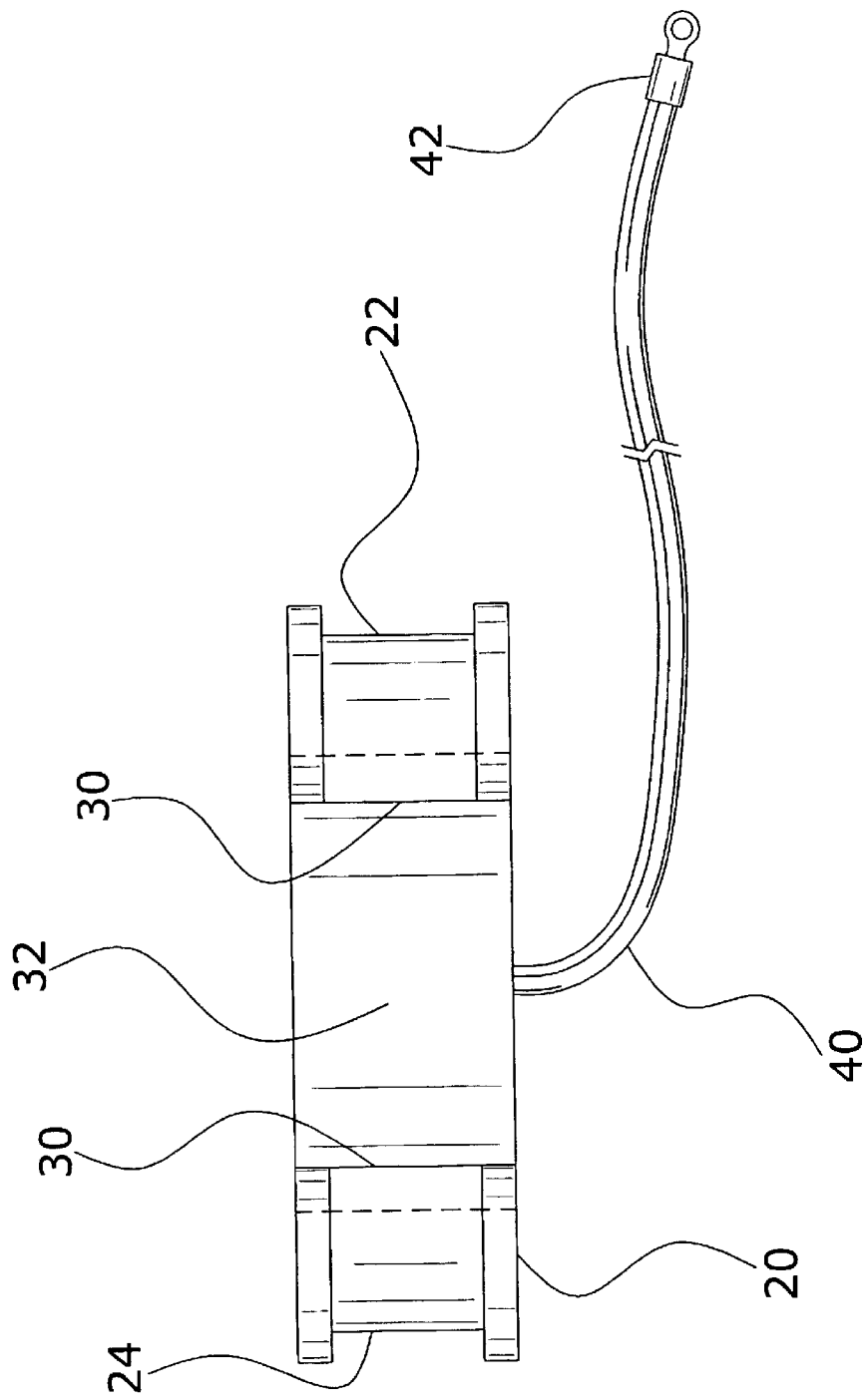
FIG. 7 is a top end view of the present invention.

A cord member 40 is preferably attached to the plug member 20 as shown in FIGS. 1, 5 and 7 of the drawings. The cord member 40 may be comprised of various structures such as but not limited to string, cable and chain. The distal end of the cord member 40 preferably has a connector member 42 for securing to the electrical box 12 as shown in FIG. 2 of the drawings. The connector member 42 may be secured to the interior or exterior of the electrical box 12 via a conventional fastener or similar fastening system. The cord member 40 prevents the loss of the plug member 20.

Figure 3:
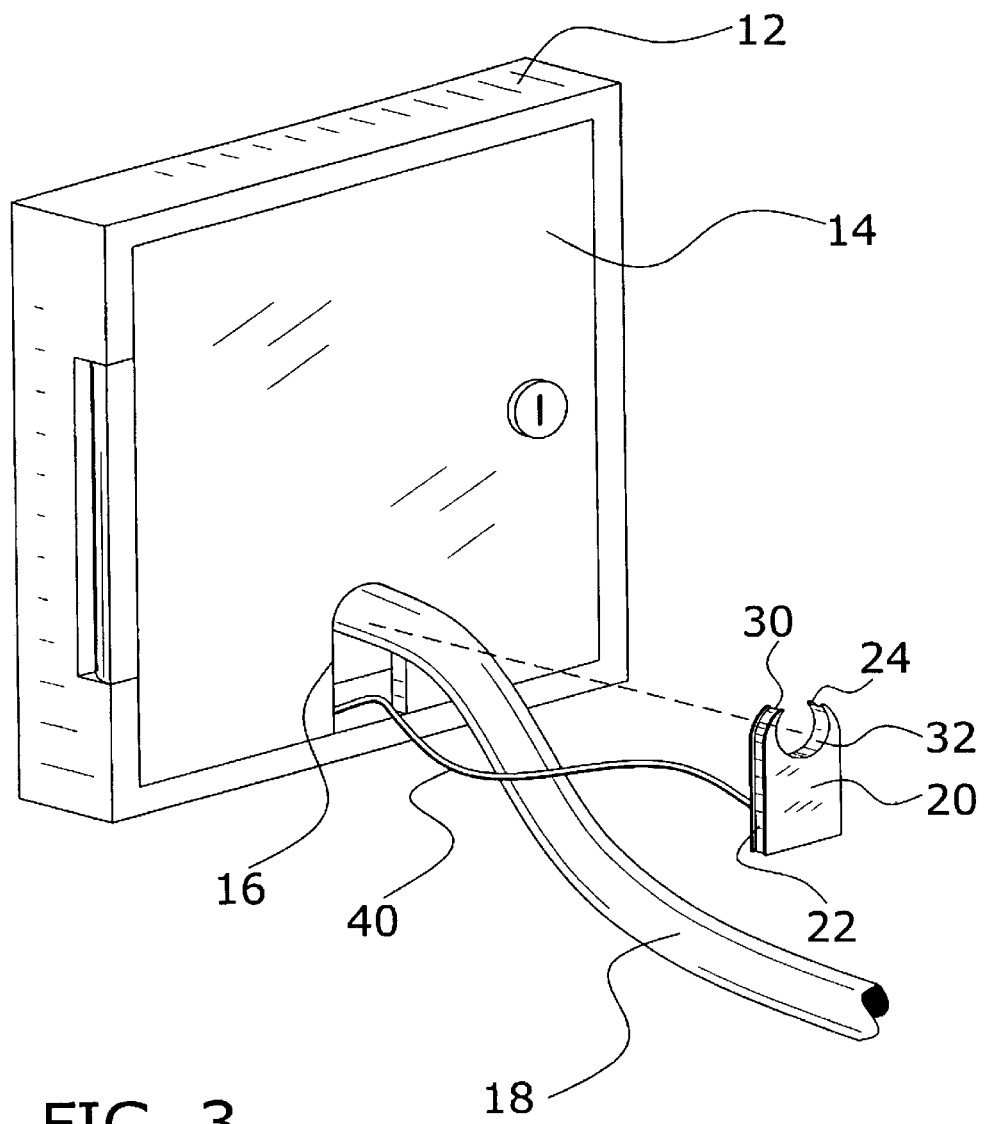
FIG. 3 is an exploded upper perspective view of the present invention with respect to an electrical access door in the closed position.

In use, the user positions the plug member 20 within the lower slot 16 of the access door 14 of the electrical box 12 with the power cord 18 positioned within the lower slot 16 as shown in FIGS. 3 and 4 of the drawings. The plug member 20 blocks the lower slot 16 about the power cord 18 and prevents the passage of rodents and debris into the interior of the electrical box 12 through the lower slot 16. If the user must open the access door 14, the plug member 20 may be removed to allow increased movement of the power cord 18 within the lower slot 16.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Index of Elements for Rodent Obstructing System

ENVIRONMENTAL ELEMENTS

10. Rodent Obstructing System
11.
12. Electrical Box
13.
14. Access Door
15.
16. Lower Slot
17.
18. Power Cord
19.
20. Plug Member
21.
22. First Side Slot
23.
24. Second Side Slot
25.
26.
27.
28.
29.
30. Upper Opening
31.
32. Receiver Opening
33.
34.
35.
36.
37.
38.
39.
40. Cord Member
41.
42. Connector Member
43.
44.
45.
46.
47.
48.
49.
50.
51.
52.
53.
54.

| Index of Elements for Rodent Obstructing System |
| --- |
| 55. |
| 56. |
| 57. |
| 58. |
| 59. |
| 60. |
| 61. |
| 62. |
| 63. |
| 64. |
| 65. |
| 66. |
| 67. |
| 68. |
| 69. |
| 70. |
| 71. |
| 72. |
| 73. |
| 74. |
| 75. |
| 76. |
| 77. |
| 78. |
| 79. |

I claim:

1. A rodent obstructing system for an access door of a camper electrical box, comprising:
   a plug member having a U-shaped structure formed to fit within a lower slot of an access door, wherein said plug member has a first end and a second end, and a first side and a second side;
   wherein said first end is substantially curved and wherein said second end is substantially straight;
   wherein said first side and said second side are substantially straight and parallel to one another;
   wherein said plug member includes a first side slot within said first side and a second side slot within said second side for receiving an interior edge of a lower slot of an access door;
   an upper opening within said first end of said plug member; and
   a receiver opening within said plug member connected to said upper opening, wherein said receiver opening receives a power cord.

2. The rodent obstructing system of claim 1, wherein said plug member is comprised of a resilient material.

3. The rodent obstructing system of claim 1, wherein said upper opening has a width smaller than a diameter of said receiver opening.

4. The rodent obstructing system of claim 1, wherein said receiver opening has a circular shape.

5. A rodent obstructing system for an access door of a camper electrical box, comprising:
   a plug member formed to fit within a lower slot of an access door;
   an upper opening within a first end of said plug member;
   a receiver opening within said plug member connected to said upper opening, wherein said receiver opening receives a power cord; and
   a cord member attached to said plug member, wherein said cord member includes a connector member for securing to a structure.

6. The rodent obstructing system of claim 5, wherein said plug member includes a first side slot and a second side slot for receiving an interior edge of a lower slot of an access door.

7. The rodent obstructing system of claim 6, wherein said first end of said plug member is curved.

8. The rodent obstructing system of claim 7, wherein said plug member is comprised of a resilient material.

9. The rodent obstructing system of claim 5, wherein said wherein said first end of said plug member is curved.

10. The rodent obstructing system of claim 5, wherein said plug member is comprised of a resilient material.

11. The rodent obstructing system of claim 5, wherein said plug member has a generally rectangular structure with said first end curved.

12. The rodent obstructing system of claim 11, wherein a second end in opposition to said first end is straight.

13. The rodent obstructing system of claim 5, wherein said upper opening has a width smaller than a diameter of said receiver opening.

14. The rodent obstructing system of claim 5, wherein said receiver opening has a circular shape.

15. A rodent obstructing system for an access door of a camper electrical box, comprising:
   a plug member having a U-shaped structure formed to fit within a lower slot of an access door, wherein said plug member has a first end and a second end, and a first side and a second side;
   wherein said first end is substantially curved and wherein said second end is substantially straight;
   wherein said first side and said second side are substantially straight and parallel to one another;
   wherein said plug member includes a first side slot within said first side and a second side slot within said second side for receiving an interior edge of a lower slot of an access door, and wherein said plug member includes a first end having a curved structure;
   an upper opening within said first end of said plug member; and
   a receiver opening within said plug member connected to said upper opening, wherein said receiver opening receives a power cord;
   wherein said plug member is comprised of a resilient material;
   wherein said upper opening has a width smaller than a diameter of said receiver opening;
   wherein said receiver opening has a circular shape.

* * * * *